United States Patent
Burke et al.

[15] 3,643,531
[45] Feb. 22, 1972

[54] MECHANICAL CHECK

[72] Inventors: John E. Burke, Rroomall; Edward J. Kaiser, Philadelphia, both of Pa.; Charles J. Myers, Woodbury, N.J.

[73] Assignee: J. E. Lonergan Company, Philadelphia, Pa.

[22] Filed: Nov. 13, 1969

[21] Appl. No.: 876,311

[52] U.S. Cl. .................................................82/11, 82/24 A
[51] Int. Cl. .........................................................B23b 5/36
[58] Field of Search ...........................82/11, 24 A, 5, DIG. 3

[56] References Cited

FOREIGN PATENTS OR APPLICATIONS

| 1,066,329 | 4/1967 | Great Britain | 82/DIG. 3 |
| 1,194,148 | 5/1959 | France | 82/5 |

*Primary Examiner*—Leonidas Vlachos
*Attorney*—Howson and Howson

[57] ABSTRACT

An attachment for a lathe having a turret slide head which mounts a tool for normal movement in a stroke axially towards the chuck, and which may be displaced laterally away from its "home" position at the forward end of its stroke by a pusher mounted on a cross slide of the lathe. This mechanical check retains the tool in its displaced position against the bias of the spring which normally seeks to return the tool to its "home" position.

9 Claims, 9 Drawing Figures

INVENTORS:
JOHN E. BURKE
EDWARD J. KAISER
CHARLES J. MYERS
BY Howson & Howson
ATTYS.

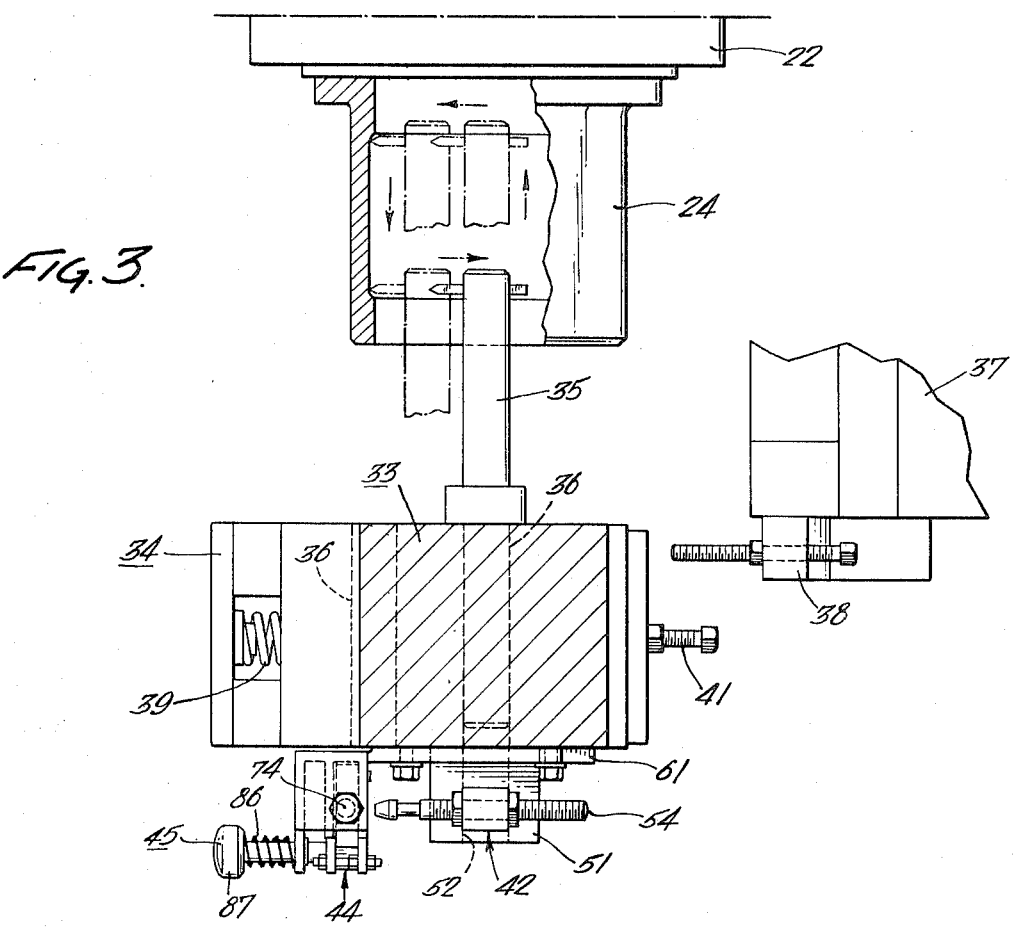
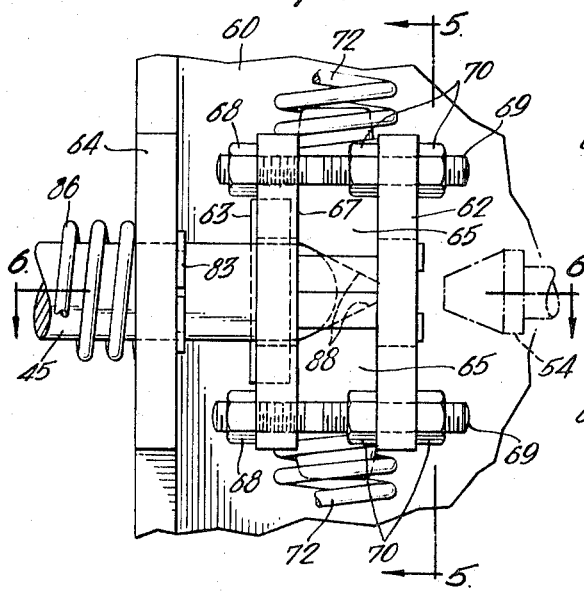
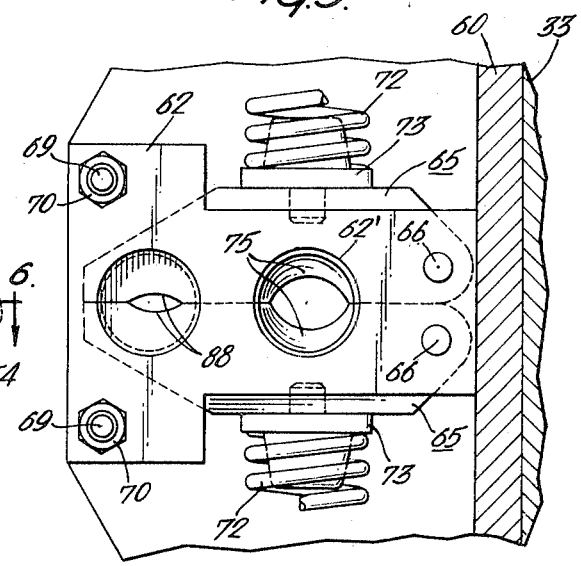

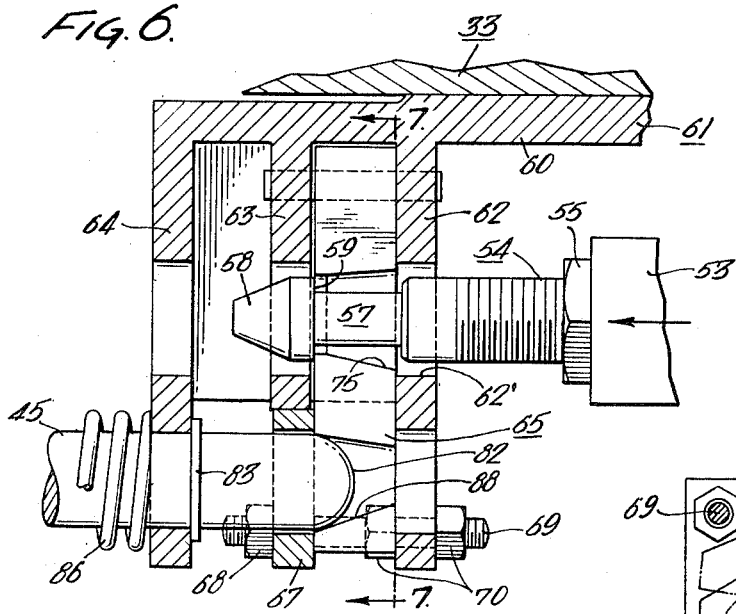
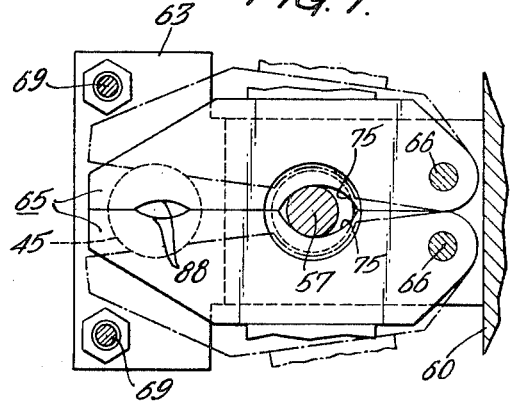
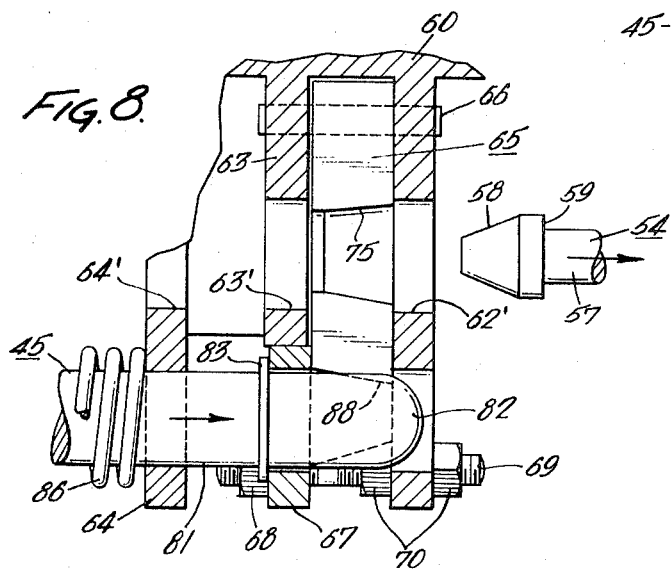
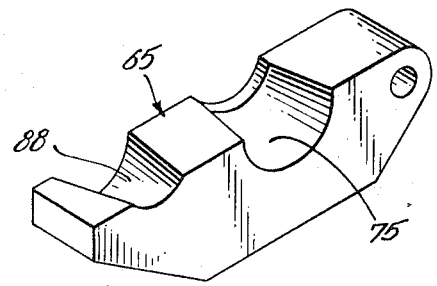

MECHANICAL CHECK

The present invention relates to automatic turret lathes, and has particular application to a mechanical check for a turret slide head having a tool mount which is displaceable laterally at the forward end of its stroke against the bias of a spring means tending to return the mount to its "home" position.

In programming automatic lathes for machining the internal surfaces of hollow members, it has been practically impossible to automatically program a machine finishing operation which produces a recessed bore, the recess of which is of an axial extent greater than the width of the tool. If a recess of such length was necessary, the finished machining of the recess was required to be performed in several operations, or to be performed manually. The programming of additional operations into the automatic lathe is an expensive procedure and reduces the capacity of the lathe for performing plural operations. On the other hand, manual operations, whether performed on the lathe or on a separate machine, entail considerable waste effort and/or wasted handling steps.

With the foregoing in mind, the present invention provides a mechanical check which enables the machining of a recessed bore in a single operation.

More specifically the present invention provides a device which responds to the automatic lateral displacement of a slide head by a pusher at one point in the stroke or travel of the tool to retain the slide head in its displaced position when the pusher is retracted prior to the rearward stroke, and to retain the tool mount in its displaced position throughout at least a portion of the stroke, so that upon reaching a second position in the stroke, the check may be released to return the tool mount to its "home" position.

In the preferred embodiment of the invention, the mechanical check mechanism is mounted between the standard slide head member and slide block member so as to avoid interference with the normal operation of the head member and yet provide the desired retention of the head member in its laterally displaced position throughout the entire rearward stroke of the slide assembly.

In the illustrated embodiment of the invention, the mechanism includes a latching element mounted on one of the slide members, a keeper mechanism mounted on the other of the slide members, the keeper being operated to engage the latching element automatically upon displacement of the slide head member on the slide block member and to release the element upon completion of the rearward stroke of the slide members to effect disengagement of the latching element from the keeper mechanism and return of the slide head member to its "home" position.

All of the objects of the invention are more fully set forth hereinafter with reference to the accompanying drawing wherein:

FIG. 3 is a sectional view taken on the line 3—3 of FIG. 1 and showing, in broken lines, the sequence of positions of the tool mount as the lathe is operated.

FIG. 4 is an enlarged fragmentary view of the keeper mechanism in end elevation;

FIGS. 5 and 6 are fragmentary sectional views taken on the lines 5—5 and 6—6 respectively of FIG. 4, FIG. 6 showing the latching element in its retained position in full lines;

FIG. 7 is a sectional view taken on the line 7—7 of FIG. 6;

FIG. 8 is a view similar to FIG. 6, showing the release of the latching element by the keeper mechanism; and FIG. 9 is a detached perspective view of a jaw of the keeper mechanism illustrating its configuration.

Figure 1:
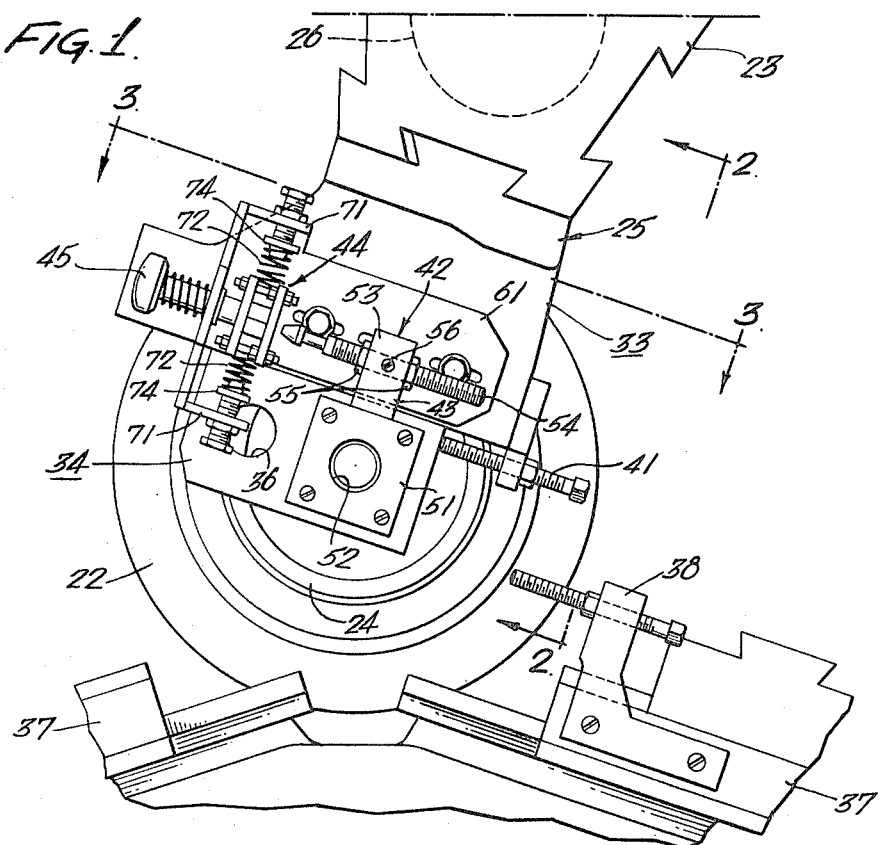
FIG. 1 is a fragmentary view of an automatic turret lathe in end elevation as seen from the right-hand end.
Figure 2:
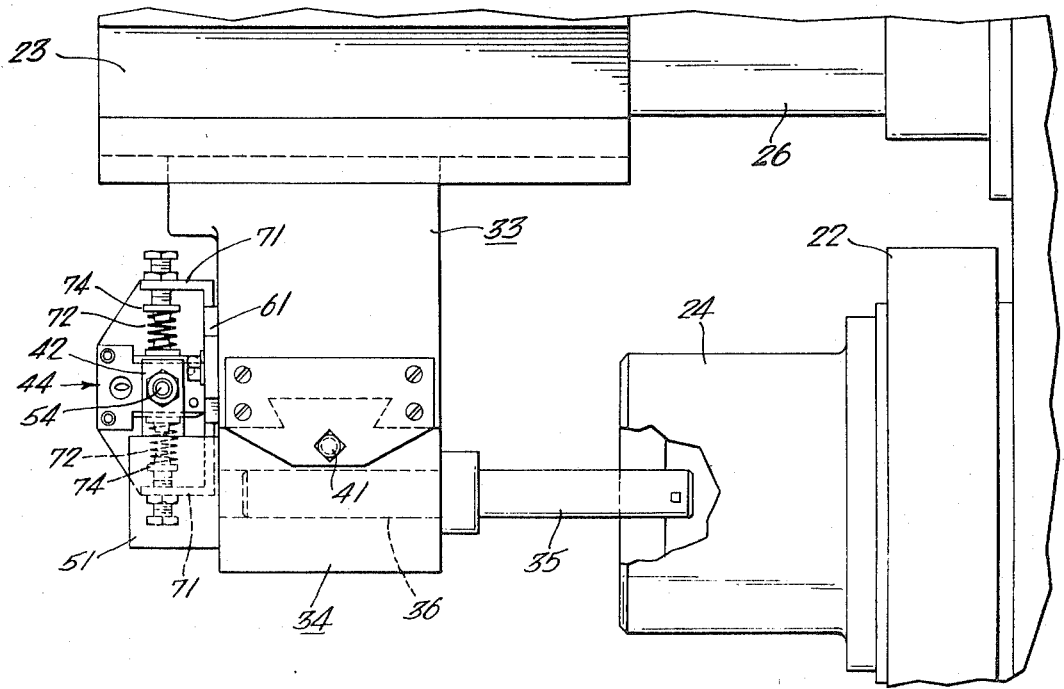
FIG. 2 is a fragmentary view of the lathe in rear elevation as seen from line 2—2 of FIG. 1.

Referring now to the drawing, FIGS. 1 to 3 inclusive illustrate a lathe having a rotatable chuck 22 at its left-hand end and a turret 23 at its other end which may be displaced axially of the chuck to perform machining operations on the exposed end of a workpiece 24 mounted in the chuck. In the present instance, a slide assembly 25 is mounted in operative position on the turret which includes a slide block member 33 fixedly mounted on the turret and a slide head member 34 mounted for lateral displacement on the slide block. The turret is displaceable axially of the chuck by conventional drive means 26 which is operated in timed relation to the rotation of the chuck so as to advance and retract the machine tool 35, mounted in one of the tool-mounting bores 36 of the slide head, toward and away from the work 24 mounted in the chuck for rotation on its axis. Front and rear cross slides 37 are positioned on the lathe to register with the slide block when it is in its advanced limit position, and in the present instance, a pusher 38 is mounted on the rear cross slide to engage the slide head 34 for displacing the same laterally on the slide block 33.

The slide head 34 is biased by spring means 39 (FIG. 3) toward a normal "home" position so that the pusher 38 operates to displace the slide head against the bias of its associated spring means 39. Upon retraction of the pusher, the spring means normally returns the slide head to its "home" position. An adjustable stop of conventional form is provided at 41 to predetermine the "home" position of the slide head 34 and the pusher 38 is likewise adjustable to predetermine the amount of lateral displacement of the slide head which is effected by the pusher 38. In accordance with the present invention, a mechanical check mechanism, designated generally as 42, is provided to retain the slide head 34 in a preselected laterally displaced position after retraction of the pusher 38.

The mechanical check mechanism 42 comprises a latching element 43 mounted on one of the slide members, in the present instance the slide head member 34, and a keeper mechanism 44 mounted on the other slide member, in the present instance the slide block member 33. Lateral displacement of the slide head 34 by the pusher 38 in turn displaces the latching element 43 into engagement with the keeper mechanism 44 to retain the slide head in a laterally displaced position. As shown in FIG. 1, the latching element 43 is adjustable to preselect the laterally displaced position, and the keeper mechanism 44 is operable to automatically interengage with the latching element upon displacement of the slide head by the pusher 38. The keeper mechanism also includes a release operator, in the present instance a plunger 45, which is operated to actuate the keeper mechanism 44 to release the latching element 43, for example at the rearward end of the stroke of the turret.

The latching element 43 comprises a mounting block 51 having a through-bore 52 which is fastened to the slide head 34 so that the bore 52 registers with the mounting bore 36 carrying the tool 35. The block 51 has an upstanding pedestal 53 having a transverse guideway in which a threaded shaft 54 is adjustably mounted. Adjustment is provided by locknuts 55 and a setscrew 56 (see FIG. 1). The shaft 54 is disposed parallel to the rear cross slide 37 so that operation of the pusher 38 displaces the shaft 54 axially with the displacement of the slide head 34. Adjacent its leading end, the shaft 54 is provided with a recessed portion of reduced diameter at 57 and terminates at its leading end in a tapered head 58, the trailing part of which cooperates with the recessed portion 57 to form a shoulder 59 (see FIGS. 6 and 8).

The keeper mechanism 44 is mounted on the slide block 33 by a mounting bracket 61 having a body portion 60 disposed flush against the slide block 33, and outwardly projecting mounting plates 62, 63 and 64. The plates are provided with registering apertures as indicated at 62', 63' and 64' to permit the passage therethrough of the threaded shaft 54. A pair of jaws 65, 65 is pivotally mounted between the plates 62 and 63 as indicated at 66,66 to cooperate with the shoulder 59 of the threaded shaft 54 to retain the latching element against rearward retraction. To this end, the forward surfaces of the jaw members 65,65 are precision finished and are retained in place by a retaining plate 67 mounted on the mounting plate 62 by means of studs 69 threaded into the retaining plate 67 and fixed thereto by locknuts 68 and adjustably anchored on the mounting plate 62 by adjusting nuts 70. In this manner, precise positioning of the forward surface of the jaws 65,65 relative to the shoulder 59 is assured.

The jaws 65,65 are biased toward one another by springs 72,72, each having a seat 73 on a jaw 65 and an adjustable seat 74 on an arm 71 extending from the bracket 61. The jaws 65,65 are cut out as indicated at 75 to provide a tapered receptacle for the tapered head 58 of the threaded shaft 54. In this manner, when the shaft 54 is advanced into the cutouts 75, the tapered head 58 cooperates with the tapered receptacle to pivot the jaws on their pivots 66 against the bias of their springs 72. When the head 59 passes through the receptacle provided by the cutouts 75, the jaws are closed by the springs 72 to engage behind the shoulder 59 and thereby retain the shaft 54 in its advanced position. Preferably the throw of the pusher 38, and the position of the threaded shaft 54 are adjusted so that the head passes beyond the jaws at precisely the forward end of the forward stroke of the pusher. In this way, the depth of cut of the tool 35 is maintained uniformly to the proper dimension throughout the entire axial travel of the tool.

Means is provided to release the jaws 65,65 at the end of the rearward stroke of the turret, in the present instance the plunger 45. To this end, the plunger 45 is mounted for longitudinal displacement through the mounting plate 64 and the retaining plate 67. In the present instance, the plunger 45 has a generally cylindrical shank 81 which terminates at its right-hand end in a rounded nose 82. A collar 83 is provided on the shaft 81 between the plates 64 and 67 to limit the rightward advance of the plunger and also to provide a leftward limit position therefor. The plunger is biased leftward by means of a spring 86 positioned between the head 87 of the plunger and the mounting plate 64. The nose 82 of the plunger cooperates with a tapered recess formed by a set of grooves 88 in the jaws 65,65 outward of the cutouts 75. As the nose 82 enters the tapered recess 88, the displacement of the nose separates the jaws 65 so as to disengage the jaws from the shoulder 59 behind the head 58. The disengagement of the jaws from the shoulder 59 permits the spring 39 of the slide head to retract the slide head to its "home" position.

In the present instance, the head of the plunger 45 is designed for manual operation when the machine has been arrested at the end of the retractive stroke of the turret. However, it will be apparent that automatic separation of the jaws at the end of the rearward stroke of the turret may be provided if it is deemed necessary to have fully automatic operation of the lathe.

The structural arrangement of the illustrated embodiment is particularly adapted to the slide head assembly illustrated, and it is apparent that other structural organizations may be more appropriate for use with other lathes.

While a particular embodiment of the present invention has been herein illustrated and described, it is not intended to limit the invention to such disclosure but changes and modifications may be made therein and thereto within the scope of the following claims:

We claim:

1. For a lathe with a slide assembly operable to travel longitudinally having a slide head member which is laterally displaceable on a slide block member and means to bias said slide head member to a "home" position, and means to displace said slide head member against said bias laterally away from said "home" position; a mechanical check mechanism to retain said slide head member in its laterally displaced position against the bias of said bias means during at least a portion of the travel of said assembly comprising:

a latching element comprising an elongated shaft mounted on said slide head member with its longitudinal axis parallel to the path of lateral movement of said slide head, said shaft terminating at its leading end in a head portion providing a rearwardly facing shoulder, and a keeper mechanism mounted on said slide block member, said keeper mechanism operable to automatically engage and retain said latching element when slide head is displaced at one point in the longitudinal travel of said slide assembly, said keeper mechanism comprising a movable element to latch with said shoulder and effect said retention, said mechanism including release means having an operator actuatable at another point in the longitudinal travel of said assembly to release the retention of said latching element by said keeper mechanism.

2. A mechanical check according to claim 1 wherein said elongated shaft is threaded and mounted for adjustment longitudinally thereof to correlate with the displacement of said slide member so as to be latched in said retained position only upon full lateral displacement of said slide head.

3. A mechanical check according to claim 1 wherein said threaded shaft is recessed along the length thereof behind said head, said recessed portion of the shaft cooperating with said head to form said shoulder.

4. A mechanical check according to claim 1 wherein said keeper mechanism comprises at least one jaw member pivoted on said slide block and displaceable by said shaft to engage behind said shaft shoulder upon lateral displacement of said slide head member.

5. A mechanical check according to claim 4 wherein said jaw is provided with a tapered cutout registering with said shaft, and said shaft head is similarly tapered so that longitudinal displacement of said shaft engages said tapered head with said tapered cutout to cam said jaw into engagement behind said shoulder, and including a bias means urging said jaw towards its engaged position whereby said keeper mechanism automatically latches said latching element in its displaced position.

6. A mechanical check according to claim 4 wherein said keeper mechanism comprises a pair of jaws, each of said jaws having a tapered cutout and individual bias means, said cutouts cooperating to provide a tapered receptacle for receiving the head of said elongated shaft, said shaft operable upon its longitudinal displacement to cam said jaws apart and permit latching thereof with said shoulder.

7. A mechanical check according to claim 6 wherein said pair of jaws are provided with registering grooves providing a tapered recess in addition to said tapered receptacle, said release means of the keeper mechanism including a plunger displaceable into said tapered recess to cam said jaws away from each other to thereby release the latching engagement of said jaws with the shoulder of said latching element.

8. A mechanical check according to claim 7 wherein said plunger has an enlarged portion serving as the operator of the release means, said plunger being biased away from engagement in said tapered recess and actuatable by said operator against the bias into said tapered recess.

9. A mechanical check according to claim 8 wherein the leading end of said plunger is rounded to provide a rounded nose cooperable with the tapered recess provided by the grooves of said jaws.

* * * * *